United States Patent
Kimber

(10) Patent No.: US 7,817,391 B2
(45) Date of Patent: Oct. 19, 2010

(54) OVER-CURRENT PROTECTION DEVICE FOR A SWITCHED-MODE POWER SUPPLY

(75) Inventor: Kurt N. Kimber, Minneapolis, MN (US)

(73) Assignee: Polar Semiconductor, Inc., Bloomington, MN (US)

( * ) Notice: Subject to any disclaimer, the term of this patent is extended or adjusted under 35 U.S.C. 154(b) by 581 days.

(21) Appl. No.: 11/796,097

(22) Filed: Apr. 26, 2007

(65) Prior Publication Data
US 2008/0266738 A1    Oct. 30, 2008

(51) Int. Cl.
*H02H 3/00*    (2006.01)
(52) U.S. Cl. .................. 361/87; 361/93.1; 361/100; 361/154; 323/282
(58) Field of Classification Search .............. 361/87, 361/93.1, 93.2, 93.7, 93.9, 94, 100, 101, 361/154; 323/282; 363/21.1, 21.04, 21.06, 363/21.09
See application file for complete search history.

(56) References Cited

U.S. PATENT DOCUMENTS

| | | | |
|---|---|---|---|
| 3,859,586 A | 1/1975 | Wadlington | |
| 4,811,184 A | 3/1989 | Koninsky et al. | |
| 4,819,122 A | 4/1989 | Gontowski, Jr. | |
| 4,928,200 A | 5/1990 | Redl et al. | |
| 5,181,155 A | 1/1993 | Beg et al. | |
| 5,485,341 A | 1/1996 | Okado et al. | |
| 5,835,361 A | 11/1998 | Fitzgerald | |
| 6,903,912 B2 | 6/2005 | Kranister et al. | |
| 7,035,071 B1 | 4/2006 | Tiew et al. | |
| 7,116,563 B2 | 10/2006 | Hua | |
| 7,161,783 B2 | 1/2007 | Yoshida | |
| 7,522,398 B2 * | 4/2009 | Tang | 361/93.9 |
| 2002/0131224 A1 | 9/2002 | Yoshida et al. | |
| 2005/0237688 A1 | 10/2005 | Wong et al. | |
| 2006/0221528 A1 | 10/2006 | Li et al. | |

* cited by examiner

*Primary Examiner*—Stephen W Jackson
*Assistant Examiner*—Terrence R Willoughby
(74) *Attorney, Agent, or Firm*—Kinney & Lange, P.A.

(57) ABSTRACT

An over-current protection device for use in a switched mode power supply prevents over-current conditions caused by short-circuits faults. The over-current protection device monitors a current in the switched mode power supply, and in particular, determines a peak current value associated with the monitored current. The monitored current is compared to a reference value to determine whether an over-current condition exists. If an over-current condition is detected, then the over-current protection device modifies the 'off' time of the switched mode power supply based on the determined peak current value.

19 Claims, 6 Drawing Sheets

OVER-CURRENT PROTECTION DEVICE FOR A SWITCHED-MODE POWER SUPPLY

BACKGROUND

The present invention relates to over-current protection devices, and more specifically to over-current protection devices for preventing over-current faults caused by short-circuit faults.

Over-current protection devices are commonly employed in switch mode power supplies (SMPS) to monitor and prevent excessive currents from forming within the SMPS. Typically, if the monitored current exceeds a defined threshold, the over-current protection device causes the switch providing power to the load to open, preventing additional power from being provided to the load and thereby limiting the current through the SMPS. However, despite the use of traditional over-current protection devices, conditions may occur that result in the generation of large currents in the SMPS. In particular, short-circuit faults experienced by a SMPS may result in a condition known as current runaway, or current ratcheting, in which load currents within a SMPS become progressively larger despite typical over-current protection methods.

SUMMARY

In one aspect of the present invention, a switch-mode power supply (SMPS) includes a first switch that is connectable to provide input power to a load in a first state and to prevent input power from being provided to the load while in a second state. The switched-mode power supply includes an over-current protection device that monitors a current associated with the SMPS and determines a peak current value associated with the monitored current. The over-current protection device causes the first switch to be placed in the second state for an amount of time that is related to the determined peak current value.

In another aspect of the present invention, a method of protecting a switch-mode power supply (SMPS) from over-current faults includes monitoring a current associated with the switched-mode power supply and determining a peak current value associated with the monitored current. The determined peak current value is compared to a threshold value to determine whether an over-current condition is present. In response to a detected over-current condition, the SMPS is placed in an 'off' state for an amount of time that is related to the determined peak current value.

DETAILED DESCRIPTION

Figure 1:
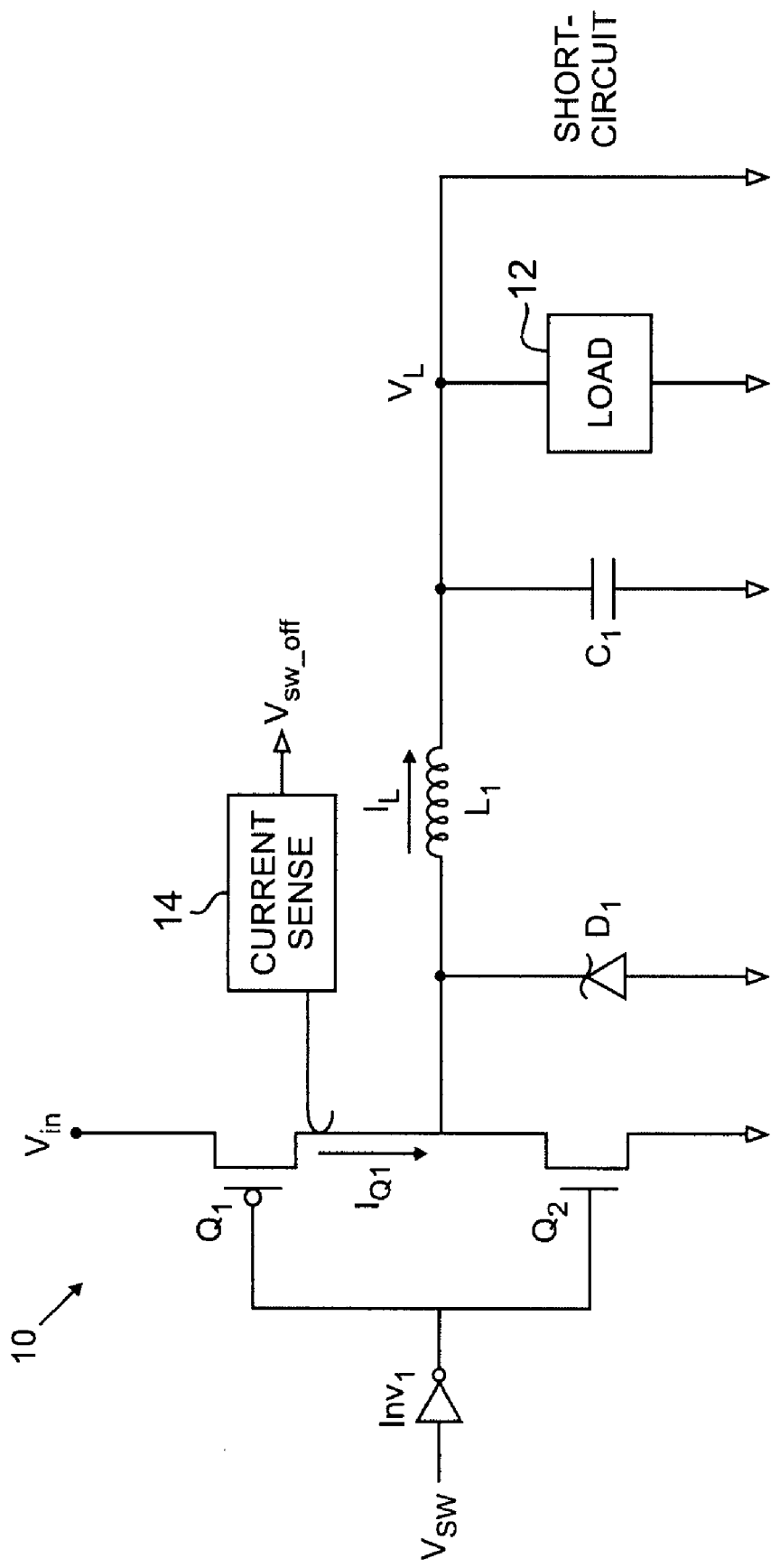
FIG. 1 is a circuit diagram of an over-current protection device as known in the prior art connected to a buck converter with a short-circuit fault across the load.
Figure 2A:
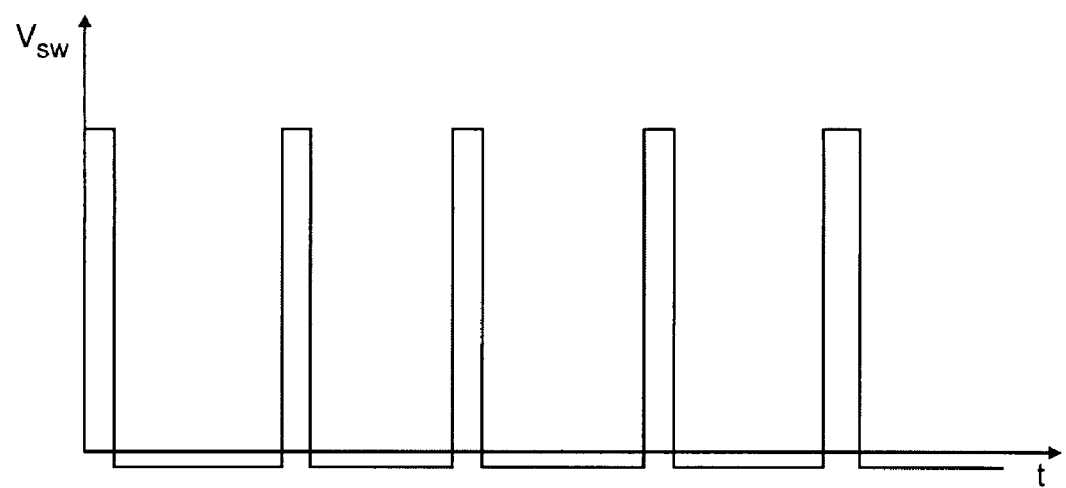
FIGS. 2A-2B are timing diagrams illustrating the inability of the prior art over-current protection device to prevent current ratcheting caused by a short-circuit fault.
Figure 2B:
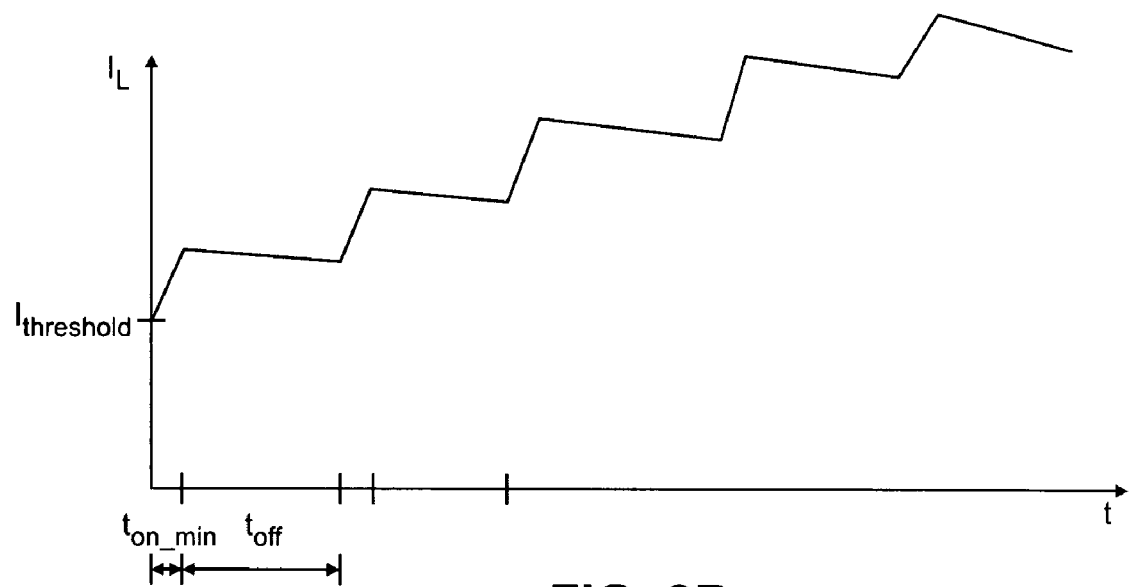

FIGS. 1 and 2A-2B illustrate a prior art method of over-current protection known as 'cycle-by-cycle' current limiting, and the inability of this protection scheme to prevent the generation of excessive currents caused by a short-circuit fault condition.

In particular, FIG. 1 illustrates buck converter device 10 connected to provide power to load 12. Buck converter device 10 is a type of switched-mode power supply (SMPS) that includes inverter $Inv_1$, a pair of transistors $Q_1$ and $Q_2$, diode $D_1$, inductor $L_1$, capacitor $C_1$, and over-current protection device 14. Buck converter device 10 regulates the power provided to load 12 by selectively placing transistors $Q_1$ and $Q_2$ in an 'on' state or 'off' state periodically under the control of timing signal $V_{sw}$. When high-side transistor $Q_1$ is conducting or 'on', then input voltage $V_{in}$ provides charging energy to inductor $L_1$, which in turn provides regulated power to load 12. When high-side transistor $Q_1$ is non-conducting or 'off', then input voltage $V_{in}$ is prevented from providing energy to inductor $L_1$, allowing inductor $L_1$ to discharge through load 12.

Over-current protection device 14 is connected to monitor the current $I_{Q1}$ through high-side transistor $Q_1$, which corresponds to the inductor current $I_L$ through inductor $L_1$. If the current $I_{Q1}$ increases above a defined threshold, then over-current protection device 14 generates a signal (labeled $V_{sw\_off}$) that places the high side transistor $Q_1$ in an 'off' state, thereby preventing input voltage $V_{in}$ from providing further charging energy to inductor $L_1$ until the next cycle. In this way, over-current protection device 14 minimizes the 'on' time of high-side transistor $Q_1$ if the measured current is greater than the defined threshold. However, cycle-by-cycle current-limiting protection does not alter the 'off' time associated with buck converter 10. Therefore, high-side transistor $Q_1$ will be placed in an 'on' state at the start of the next cycle and current protection device 14 will again determine whether the inductor current $I_L$ exceeds the defined threshold. FIGS. 2A and 2B illustrate the effect of cycle-by-cycle current-limiting protection during a short-circuit fault condition such as the one shown in FIG. 1.

FIG. 2A illustrates the timing signal $V_{sw}$ applied to high-side transistor $Q_1$ that determines whether high-side transistor $Q_1$ is 'on' or 'off' (i.e., conducting or non-conducting). FIG. 2B illustrates the inability of cycle-by-cycle current-limiting protection to prevent inductor currents $I_L$ from increasing during a short-circuit fault condition. As discussed above, the cycle-by-cycle current-limiting method of over-current protection compares the measured high side switch current $I_{Q1}$ to a threshold value to determine if an over-current condition exists. If an over-current condition is detected, then high-side transistor $Q_1$ is turned 'off' in order to prevent input voltage $V_{in}$ from further increasing inductor current $I_L$. The cycle-by-cycle current-limiting method of over-current protection does not prevent the assertion of the timing signal $V_{sw}$, but rather seeks to minimize the 'on' time of timing signal $V_{sw}$. Therefore, in the over current situation the 'on' time $t_{on\_min}$ and 'off' time $t_{off}$ associated with the timing signal $V_{sw}$ remains constant. In addition, due to propagation delays, the amount of time that timing signal $V_{sw}$ remains 'on' following detection of an over-current condition is constrained to a minimum value $t_{on\_min}$. That is, over-current protection device 14 is unable to reduce the duration in which timing signal $V_{sw}$ is 'on' beyond some minimum time $t_{on\_min}$.

FIG. 2B illustrates the resulting increase in inductor current $I_L$ despite the cycle-by-cycle current-limiting protection scheme of limiting the 'on' time associated with high-side transistor $Q_1$. As shown in FIG. 2B, inductor current $I_L$ increases rapidly during the minimum 'on' time $t_{on\_min}$ of high-side transistor $Q_1$. Likewise, inductor current $I_L$ discharges or decreases relatively slowly during the 'off' time $t_{off}$ of high-side transistor $Q_1$. Despite efforts by over-current protection device 12 to reduce the 'on' time of high-side transistor $Q_1$, the minimum amount of time $t_{on\_min}$ that timing signal $V_{sw}$ remains 'on' during each cycle allows inductor current $I_L$ to increase rapidly. Likewise, the inability of cycle-by-cycle current-limiting protection to modify the 'off' time $t_{off}$ between successive cycles results in the inductor current $I_L$ only reducing by a small amount before the next cycle begins. In this way, the inductor current becomes progressively higher with each successive cycle, a phenomenon sometimes referred to as "current ratcheting".

Figure 3:
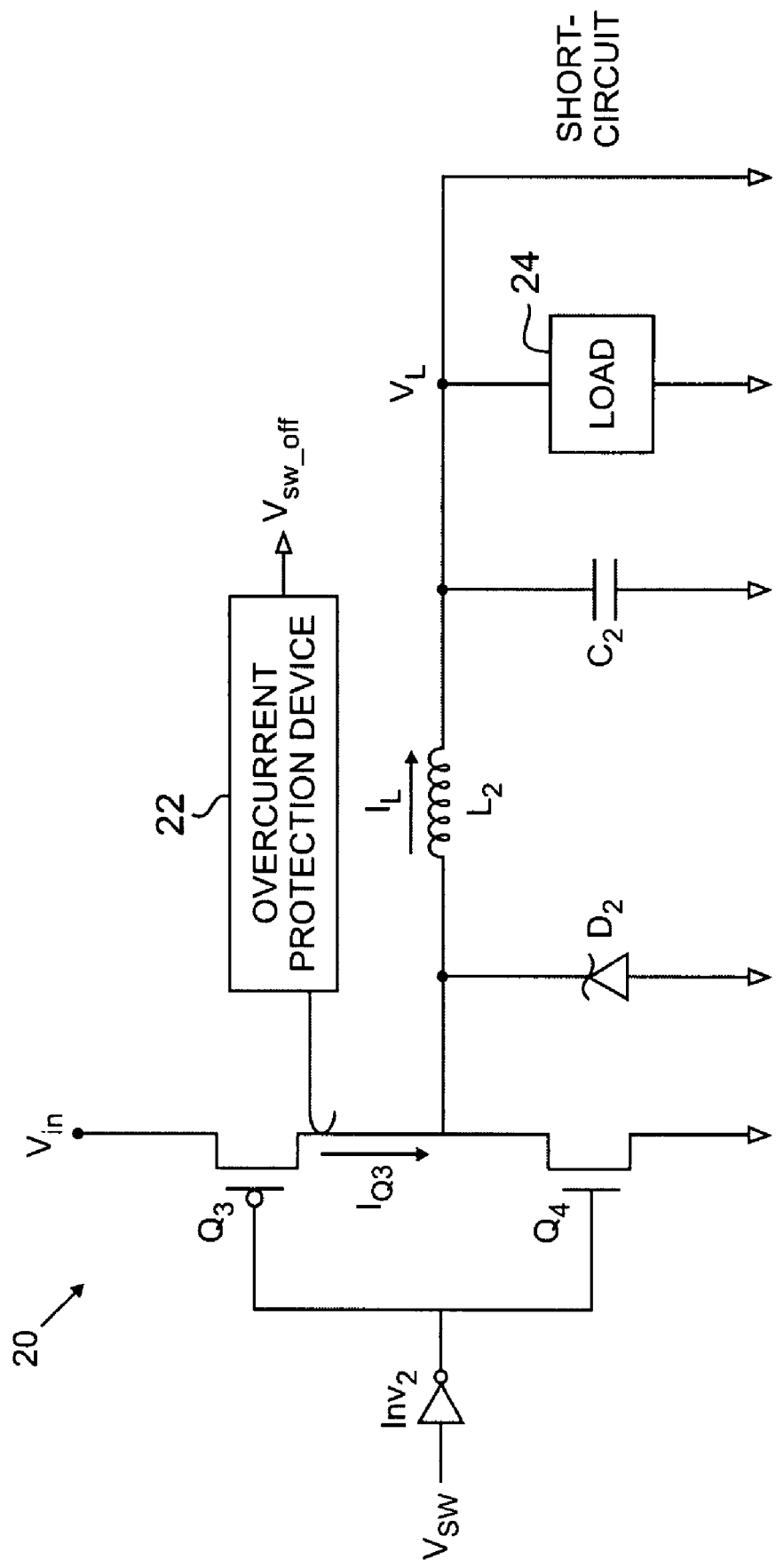
FIG. 3 is a device diagram of a dynamic over-current protection device connected to a buck converter with a short-circuit condition across the load.

FIG. 3 illustrates a dynamic over-current protection device according to the present invention that provides over-current protection, and in particular, prevents current ratcheting in short-circuit conditions. Specifically, FIG. 3 shows a circuit diagram of buck converter 20 that includes over-current protection device 22. A buck converter is one example of a switched-mode power supply for which the over-current protection device 22 is suitable. In other embodiments, over-current protection device 22 may be used in conjunction with other configurations of switched-mode power supplies or converters. For example, in other SMPS topologies the inductor employed by the buck converter may be replaced with a transformer.

Buck converter 20 is identical to buck converter 10 shown in FIG. 1, and includes inverter $Inv_2$, first and second transistors $Q_3$ and $Q_4$, diode $D_2$, inductor $L_2$, capacitor $C_2$, and load 24. As in the example discussed with respect to FIG. 1, buck converter 20 is shown here with a short-circuit fault connected across load 24. Dynamic over-current protection device 22 is connected to monitor current $I_{Q3}$ in high-side transistor $Q_3$, which corresponds to inductor current $I_L$ through inductor $L_2$. Although in this embodiment current is measured in transistor $Q_3$, in other embodiments, over-current protection may be implemented by monitoring or measuring currents at other suitable locations (such as directly at inductor $L_2$). Based on the monitored transistor current $I_{Q3}$ (or inductor current $I_L$), over-current protection device 22 generates an output signal (labeled '$V_{sw\_off}$') that prevents timing signal $V_{sw}$ from providing an 'on' signal to transistor $Q_3$, thereby forcing transistor $Q_3$ into an 'off' state. That is, the signal $V_{sw\_off}$ generated by the dynamic over-current protection device 22 acts to block the timing signal $V_{sw}$ from turning 'on' transistor $Q_3$.

In particular, over-current protection device 22 measures or otherwise determines the peak magnitude of the inductor current $I_L$ and causes the high-side transistor $Q_3$ to be maintained in the 'off' state for a length of time that is related to the magnitude of the peak current. In this way, over-current protection device 22 alters the 'off' time associated with the timing signal $V_{sw}$ based on the peak current value associated with inductor current $I_L$. By selectively modifying the amount of time high-side transistor $Q_3$ is maintained in the 'off' state (i.e., increasing the 'off' time of high-side transistor $Q_3$), over-current protection device 22 allows inductor current $I_L$ in inductor $L_2$ to decrease.

In one embodiment, buck converter 20 is operated at a defined frequency commonly referred to as the switching frequency. That is, timing signal $V_{sw}$ turns high-side transistor $Q_3$ 'on' and 'off' at a rate defined by the switching frequency. In this embodiment, dynamic over-current protection device 22 dynamically modifies the switching frequency of buck converter 20 in response to a detected over-current condition.

In particular, the magnitude of change in the switching frequency is related to the magnitude of the determined peak current value. As the magnitude of the peak current increases, over-current protection device 22 responds by either linearly or non-linearly decreasing the switching frequency. In essence, by decreasing the switching frequency the 'off' time associated with timing signal $V_{sw}$ is increased, allowing inductor current $I_L$ in inductor $L_2$ to decrease.

Figure 4:
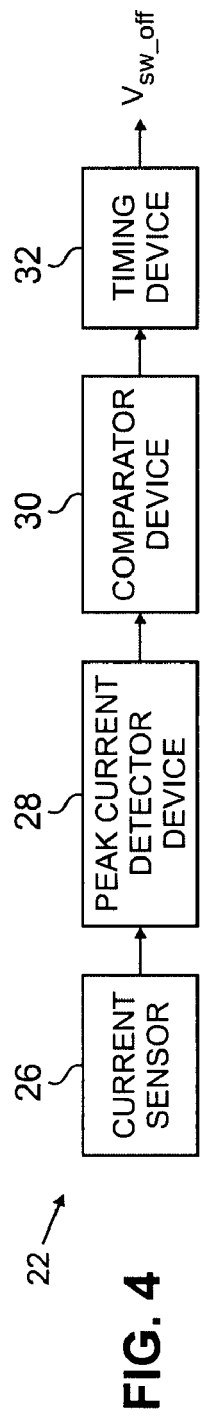
FIG. 4 is a block diagram of the dynamic over-current protection device shown in FIG. 3.

FIG. 4 is a block diagram illustrating the functions performed by one embodiment of over-current protection device 22. In this embodiment, over-current protection device 22 includes current sensor 26, peak current detector device 28, comparator device 30, and timing device 32. Current sensor 26 is connected to measure inductor current $I_L$. The measured inductor current $I_L$ is provided to peak current detector device 28, which measures or detects the peak current associated with inductor current $I_L$. The peak current value (or a value representing or related to the peak current value) determined by current detector device 28 is provided to comparator device 30, which compares the peak current value with a reference value or threshold to determine whether an over-current condition exists. Based on the result of this comparison and the magnitude of the peak current, timing device 32 dynamically modifies the amount of time transistor $Q_3$ should be maintained in the 'off' state by generating the $V_{sw\_off}$ signal for an amount of time that is related to the peak current value. This has the effect of dynamically modifying the 'off' time associated with the switched-mode power supply. The greater the magnitude of the peak current value, the longer timing device 32 will continue to generate the $V_{sw\_off}$ signal, thereby maintaining high-side transistor $Q_3$ in the 'off' state for a longer duration of time. In addition, the duration of the signal $V_{sw\_off}$ may be linearly or non-linearly related to the magnitude of the determined peak current value.

In one embodiment, the functions described with respect to FIG. 4 are implemented with a digital processor. A digitized value representing the sensed or monitored current would be provided to the digital processor. Based on this value, the digital processor detects the peak current associated with the monitored current, compare the peak current with a reference or threshold value, and based on the comparison controls an amount of time high-side transistor $Q_3$ is maintained in the 'off' state.

Figure 5:
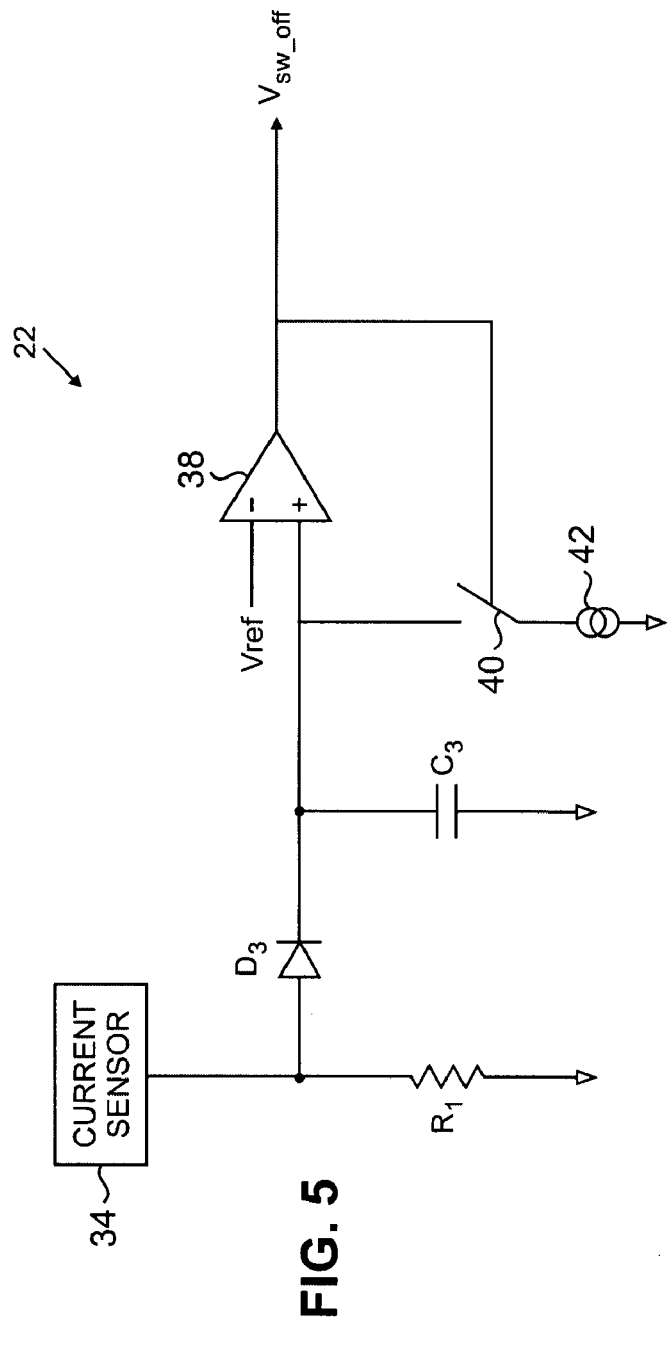
FIG. 5 is a device diagram of one embodiment of the dynamic over-current protection device shown in FIG. 4.

FIG. 5 is a circuit diagram of another embodiment of the dynamic over-current protection device 22 as shown in FIG. 4. In this embodiment, over-current protection device 22 includes current sensor 34, resistor $R_1$, diode $D_3$, capacitor $C_3$, comparator 38, switch 40, and discharge current network 42. Current sensor 34 senses inductor current $I_L$ (or a current related to $I_L$) and delivers a current that is related to the sensed current to resistor $R_1$. In one embodiment, current sensor 34 will most likely reduce the large sensed inductor current $I_L$ (on the order of amperes) to a relatively small current (on the order of micro-amperes to milli-amperes). In addition, the value output from current sensor 26 may be linearly or non-linearly related to the inductor current. In response, resistor $R_1$ converts the current provided by current sensor 34 to a related voltage value. The voltage representing the sensed inductor current is provided through diode $D_3$ to capacitor $C_3$ and comparator 38. In this embodiment, capacitor $C_3$ captures a value related to the peak value of inductor current $I_L$. The voltage representing the measured inductor current is provided to comparator 38, which compares the voltage representing the measured peak inductor current to a reference voltage. When the voltage representing the measured peak inductor current exceeds the reference voltage (indicating an over-current condition), then comparator 38 generates output signal $V_{sw\_off}$, which causes transistor $Q_3$ to be turned 'off'. In addition, output signal $V_{sw\_off}$ generated by comparator 38, indicating that the measured peak inductor current exceeds the reference voltage, also causes switch 40 to close. Once switch 40 is closed, then capacitor $C_3$ (charged to a voltage related to the peak inductor current), switch 40, and discharge current network 42 act as a timing device, wherein the voltage stored by capacitor $C_3$ is discharged through switch 40 at a rate determined by discharge current network 42. When the voltage stored on capacitor $C_3$ is discharged below the value of the reference voltage, then the output of comparator 38 changes state, allowing transistor $Q_3$ to be switched to the 'on' state, and opening switch 40.

The embodiment shown in FIG. 5 is a simplified version of a device that would be used to implement dynamic over-current protection device 22. In other embodiments, timing device 40 is comprised of a switched-capacitor resistor network that generates the $V_{sw\_off}$ signal for an amount of time that is proportional to the charge stored by peak detector capacitors. In addition, the dynamic over-current protection scheme may be used in conjunction with a typical cycle-by-cycle current-limiting protection device that generates a signal causing high-side transistor $Q_3$ to be turned 'off' in response to a detected over-current condition. That is, the cycle-by-cycle device may be used to initially place transistor $Q_3$ in the 'off' state, while dynamic over-current protection device would determine the length of time transistor $Q_3$ should remain in the 'off' state.

Figure 6A:
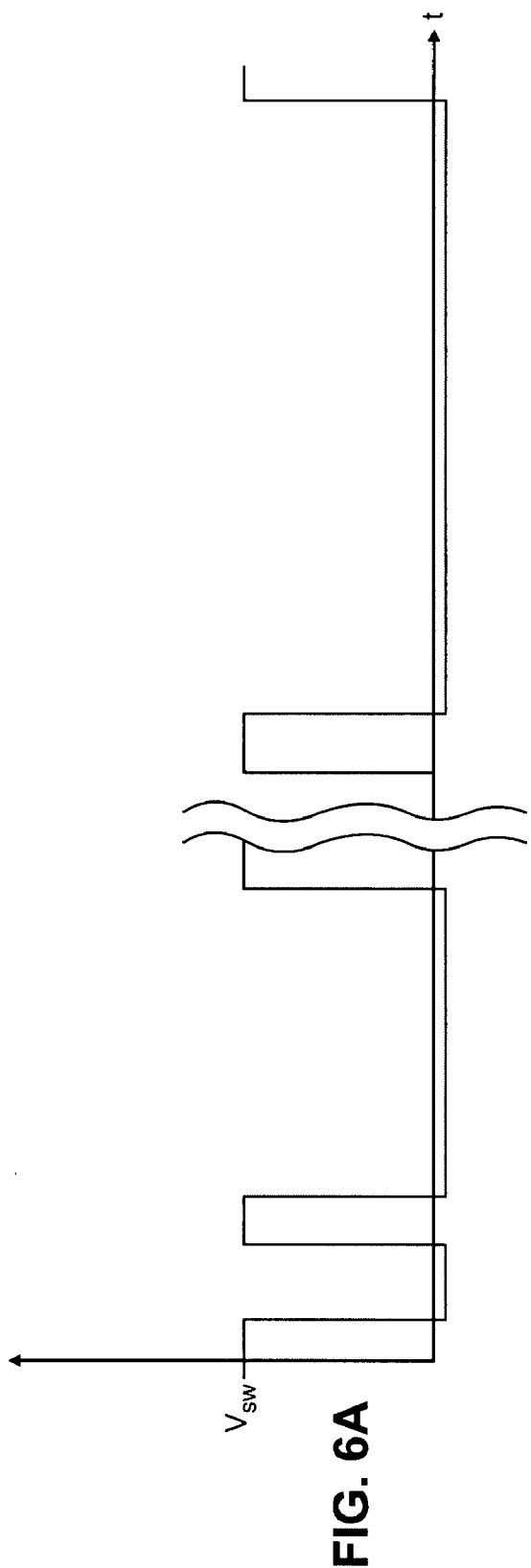
FIGS. 6A-6C are timing diagrams illustrating the ability of the dynamic over-current protection device to maintain safe current magnitudes despite short-circuit conditions.
Figure 6B:
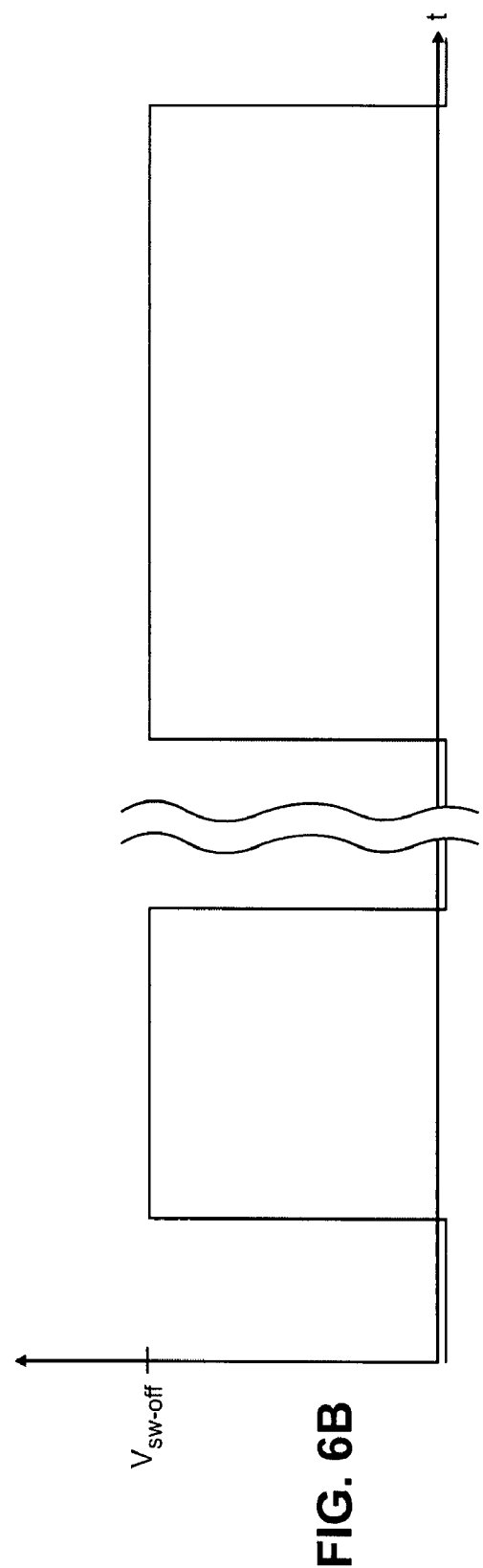
Figure 6C:
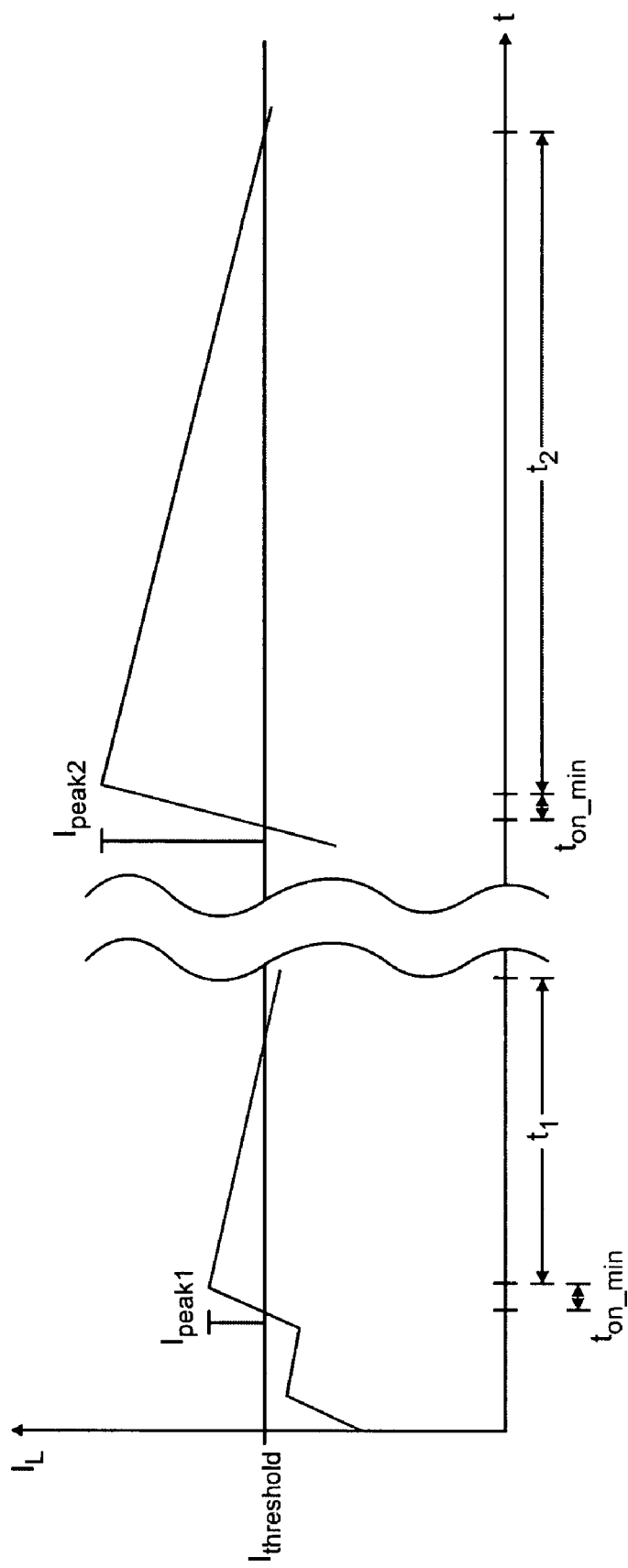

FIGS. 6A-6C illustrates the operation and performance of dynamic over-current protection device 22. The left side of each chart illustrates the response by dynamic over-current protection device 22 to a first over-current condition, and the right side of each chart illustrates the response by dynamic over-current protection device 22 to a second over-current condition. In particular, FIG. 6A illustrates the on/off signals (timing signal $V_{sw}$) provided to transistor $Q_3$, with a low signal indicating that transistor $Q_3$ is 'off' and a high signal indicating that transistor $Q_3$ is 'on'. FIG. 6B illustrates the output signal $V_{sw\_off}$ generated by dynamic over-current protection device 22 (as shown in FIG. 3), wherein a high output signal represents a blocking signal that prevents timing signal $V_{sw}$ from placing high-side transistor $Q_3$ in the 'on' state. FIG. 6C illustrates the inductor current $I_L$ generated through buck converter 20 during a short-circuit condition as a result of the operation of dynamic over-current protection device 22.

For instance, in the first example shown on the left-hand side of FIGS. 6A-6C, an inductor current $I_L$ exceeds the threshold value (labeled $I_{threshold}$) and obtains a maximum (peak) value of $I_{peak1}$ during the minimum 'on' time $t_{on\_min}$ of transistor $Q_3$. In response to the magnitude by which the inductor current exceeds the threshold value, dynamic over-current protection device 22 generates an output signal $V_{sw\_off}$ (i.e., output signal $V_{sw\_off}$ has a voltage level corresponding to an 'on' condition) for duration of time $t_1$. During this time, the output signal $V_{sw\_off}$ prohibits timing signal $V_{sw}$ from being able to turn 'on' transistor $Q_3$. In this way, the 'off' time of timing signal $V_{sw}$ is increased to allow inductor $L_2$ additional time to discharge. As shown in FIG. 6C, the duration of time $t_1$ in which high-side transistor $Q_3$ is maintained in the 'off' state allows inductor current $I_L$ to discharge below the threshold value.

In the other example, shown on the right-hand side of FIGS. 6A-6C, a inductor current $I_L$ exceeds the threshold value and obtains a maximum (peak) value of $I_{peak2}$ before transistor $Q_3$ can be placed in the 'off' state (i.e., during the minimum 'on' time $t_{on\_min}$ of transistor $Q_3$). In this case, because the magnitude of $I_{peak2}$ is greater than the magnitude of $I_{peak1}$, the output signal $V_{sw\_off}$ is maintained in the 'high' or 'on' state for a longer duration of time (i.e., $t_2 > t_1$). While the output signal $V_{sw\_off}$ is in the 'high' state, the timing signal $V_{sw}$ provided to transistor $Q_3$ is maintained in the 'low' or 'off' state, thereby maintaining transistor $Q_3$ in an 'off' state. By increasing the 'off' time of timing signal $V_{sw}$, inductor current $I_L$ is allowed to discharge to a value below the threshold value. In the examples illustrated in FIGS. 6A-6C, the 'on' time of timing signal $V_{sw}$ is minimized to the shortest allowable duration of time, as indicated by the label $t_{on\_min}$. In other embodiments, the 'on' time of timing signal $V_{sw}$ may be greater than $t_{on\_min}$.

As shown by these examples, dynamic over-current protection device 22 monitors inductor current $I_L$ and measures a value associated with the peak of the inductor current. Based on the measured peak current magnitude, dynamic over-current protection device 22 modifies the amount of time transistor $Q_3$ is maintained in the 'off' state (i.e., by modifying the duration of 'off' time associated with the timing signal $V_{sw}$). A benefit of this method of adaptively or dynamically modifying the amount of the SMPS is maintained in the 'off' state (i.e., the amount of time transistor $Q_3$ is maintained in the 'off' state) based on the measured peak inductor current value (or value related to the peak inductor current) is the ability to allow the inductor current sufficient time to discharge before applying additional charging energy. This method differs from traditional methods such as cycle-by-cycle current-limiting in which $V_{sw}$ is allowed to turn 'on' each cycle.

Although the present invention has been described with reference to preferred embodiments, workers skilled in the art will recognize that changes may be made in form and detail without departing from the spirit and scope of the invention. Particularly, while some forms of the invention are described in the form of discrete devices, it is recognized that the circuit is preferably reduced to practice in the form of an integrated circuit (IC). Therefore, terms such as "device" and the like should be construed in their broadest contexts to include portions of ICs that are conveniently described as functional components, as well as discrete devices. Likewise, some forms of the invention are described in terms of logical gates and chips that could also be implemented by discrete devices, all within the scope and spirit of the present invention.

The invention claimed is:

1. A switched mode power supply (SMPS) comprising:
a first switch connectable to provide input power to a load in a first state and to prevent input power from being provided to the load in a second state, wherein the first switch is operated at a switching frequency to regulate the power provided by the SMPS; and
an over-current protection device that monitors current associated with the SMPS and decreases the switching frequency at which the first switch is operated by controlling the first switch to be placed in the second state for an amount of time that is based on a peak current value associated with the monitored current.

2. The SMPS of claim 1, wherein the over-current protection device includes:
a current sensor for monitoring the current associated with the SMPS;
a peak current detector device for determining the peak current value associated with the monitored current; and
a timing device that determines the amount of time to maintain the first switch in the second state based on the peak current value determined by the peak current detector device.

3. The SMPS of claim 2, wherein the over-current protection device further includes:
a comparator device that compares the peak current value to a reference value to determine whether an over-current condition exists and in response to a detected over-current condition causes the first switch to be placed in the second state and provides a start signal to the timing device to determine the amount of time the first switch should be maintained in the second state.

4. The SMPS of claim 3, wherein the peak current detector device includes:
a capacitor for storing a voltage value that is representative of the peak current value.

5. The SMPS of claim 4, wherein the timing device includes:
a second switch that connects the capacitor to a current discharge network, wherein in response to the start signal provided by the comparator device the second switch is closed to allow the at least one capacitor to discharge through the current discharge network, wherein the amount of time the first switch remains in the second state is based on the time required for the voltage stored by the capacitor to discharge to a determined level.

6. The SMPS of claim 1, wherein the over-current protection device controls the first switch to be placed in the second state for an amount of time that increases linearly with respect to an amount the peak current value exceeds a threshold value.

7. The SMPS of claim 1, wherein the over-current protection device controls the first switch to be placed in the second state for an amount of time that increases non-linearly with the respect to an amount the peak current value exceeds a threshold value.

8. The SMPS of claim 1, wherein the over-current protection circuit is implemented with a digital processor.

9. A method of protecting a switch-mode power supply from over-current faults, the method comprising:
regulating power provided by the switch-mode power supply by operating a switch at a switching frequency;
monitoring a current associated with the switched mode power supply;
determining a peak current value associated with the monitored current;
comparing the peak current value to a threshold value to detect the presence of an over-current condition; and
decreasing the switching frequency of the switched-mode power supply in response to a detected over-current condition by placing the switch in an 'off' state for an amount of time that is related to the determined peak current value.

10. The method of claim 9, wherein determining the peak current value associated with the monitored current includes:
storing a voltage that is representative of the determined peak current value to a capacitor.

11. The method of claim 9, wherein the amount of time the SMPS is placed in the 'off' state is linearly related to an amount the determined peak current value exceeds a threshold value.

12. The method of claim 9, wherein the amount of time the SMPS is placed in the 'off' state is non-linearly related to an amount the determined peak current value exceeds a threshold value.

13. The method of claim 9, wherein controlling the amount of time the SMPS is maintained in the 'off' state results in a dynamic modification of a switching frequency associated with the SMPS.

14. An overload protection device for use with a switched mode power supply (SMPS), the over-current protection device comprising:
means for monitoring a current generated in the SMPS;
means for determining a peak current value associated with the monitored current;
means for comparing the peak current value to a threshold value to detect the presence of an over-current condition; and
means for dynamically modifying a switching frequency associated with the SMPS in response to a detected over-current condition, wherein the switching frequency is modified based on the determined peak current value.

15. The over-current protection device of claim 14, wherein the means for determining a peak current value associated with the load current includes:
means for converting the determined peak current value to a voltage value; and
at least one capacitor connected to store the voltage value.

16. The over-current protection device of claim 15, wherein the means for comparing the monitored to a threshold value includes:
a comparator device that detects over-current conditions by comparing the voltage value to a reference voltage, wherein the comparator device provides an output signal that causes the SMPS to be turned to an 'off' state when an over-current condition has been detected.

17. The over-current protection device of claim 16, wherein the means for dynamically modifying the switching frequency associated with the switched mode power supply includes:
a timing device that maintains the SMPS in the 'off' state for an amount of time that is related to the voltage stored by the at least one capacitor, wherein the switching frequency is a function of the amount of time the SMPS is maintained in the 'off' state.

18. The over-current protection device of claim 14, wherein the timing device includes:
a switch connected between the at least one capacitor and a current discharge network, wherein the detection of an over-current condition by the comparator causes the switch to close and the at least one capacitor to discharge through the current discharge network, wherein the time required to discharge the capacitor to a threshold value determines the amount of time the SMPS is maintained in the 'off' state.

19. The over-current protection device of claim 14, wherein the switching frequency of the SMPS is decreased as the determined peak current value increases.

* * * * *